A. P. HARTMANN.
OBSERVATION INSTRUMENT.
APPLICATION FILED APR. 1, 1913.
1,134,610.
Patented Apr. 6, 1915.
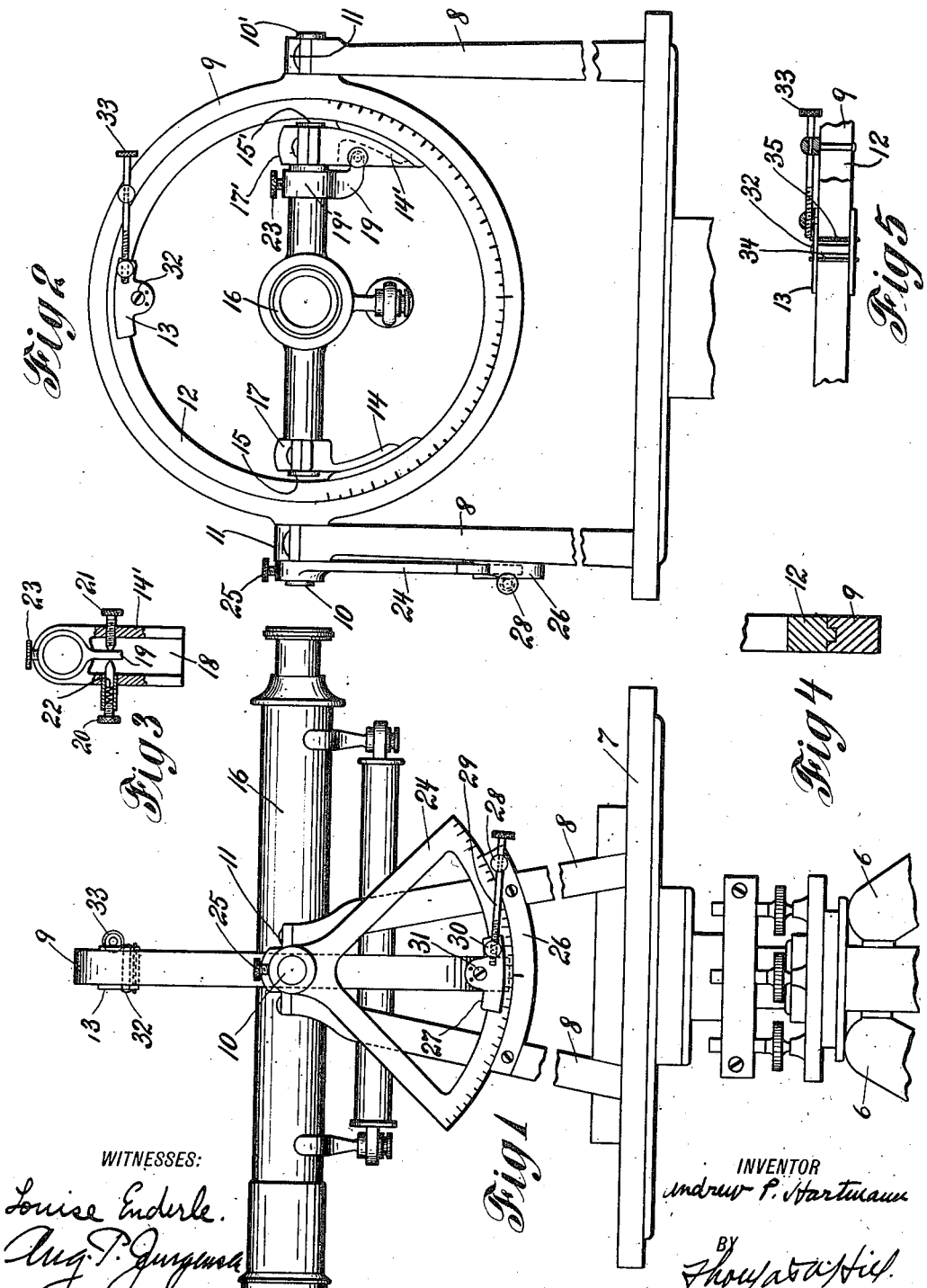
WITNESSES:
Louise Enderle.
Aug. P. Jurgens
INVENTOR
Andrew P. Hartmann
BY
Thomas A. Hill
ATTORNEY

UNITED STATES PATENT OFFICE.

ANDREW P. HARTMANN, OF YONKERS, NEW YORK.

OBSERVATION INSTRUMENT.

1,134,610.  Specification of Letters Patent.  Patented Apr. 6, 1915.

Application filed April 1, 1913. Serial No. 758,141.

*To all whom it may concern:*

Be it known that I, ANDREW P. HARTMANN, a citizen of the United States, residing at Crestwood, Yonkers, in the county of Westchester and State of New York, have invented certain new and useful Improvements in Observation Instruments, of which the following is a specification, reference being had therein to the accompanying drawing.

My invention relates to improvements in observation instruments, and is particularly adapted for and is illustrated in the accompanying drawings in its application to surveying instruments having a sighting device in two planes.

One of the principal objects of my invention is to provide a simple, strong and durable surveying instrument which can be used for the usual purposes to which a surveying instrument is put and which is capable of a plurality of adjustments by which the sighting device can be sighted along lines lying in a plane at an angle with the horizontal plane and a vertical plane, and which can be used for the various different kinds of surveying such as in railroad, mining, building, geographic and geodetic surveying.

In the accompanying drawings I have illustrated in Figure 1, with parts broken away, a vertical side elevation of a surveying instrument illustrating one application of my invention. Fig. 2 is a view looking from right to left at Fig. 1 with the lower part omitted. Fig. 3 is an enlarged detail of one of the adjustments hereinafter referred to. Fig. 4 is a cross section of the two main supporting rings, and Fig. 5 is another enlargement in detail of one of the adjustment means.

6 indicates the usual form of tripod upon the top of which is mounted the usual table 7 carrying the standards 8 upon the top of which is mounted the ring 9 having trunnions 10—10' secured by suitable caps such as 11 in the usual well known manner.

12 is an inner split ring, the adjacent ends of which are covered by the clamp indicated by the reference character 13, and 14—14' are suitable brackets supporting the trunnions 15—15' projecting from the telescope 16, said brackets being secured to said inner split ring 12. The said trunnions 15—15' it will be observed are held in position by suitable caps such as 17—17'. The bracket 14' it will be observed is provided with a hollow interior indicated by the reference character 18 to better advantage in Fig. 3 into which projects the tongue or tail 19 of the ring 19' between the adjusting screws 20—21, projecting through the side of said bracket, the screw 20 being separated by a suitable spring such as 22 which projects its inner end as shown.

23 is a suitable adjusting screw for securing the ring 19' in position. The trunnion 10 it will be observed is provided with the triangular member 24 which may be secured by the thumb screw 25, the periphery of said triangular member being adapted to slide within the frame 26 and being provided with the clamp 27 as shown.

28 is a suitable rotatable post mounted upon the frame 26 and provided with a hole or bore therethrough to receive the thumb screw 29 which enters a similar post 30 upon the clamp 27. When the telescope 16 is to be adjusted the screw 31 of the clamp 27 is loosened and when the telescope has been shifted the same is tightened. To obtain a still finer adjustment the thumb screw 29 is then rotated and the angle is read upon the scale marked upon the triangular member 24 according to its position with reference to the indicating mark upon the frame 26. For adjusting the instrument at right angles to the first adjustment, the screw 32 of the clamp 13 is loosened and the inner ring 12 is shifted to the desired position after which the screw 32 is tightened and the thumb screw 33 is adjusted until a finer adjustment is obtained, the same being read from the scale upon the inner ring 12 with respect to the indicating mark upon the outer ring as shown. A still further adjustment of the instrument may be had by tightening the ring 19' by the thumb nut 23, after which the adjustment may be further regulated by the thumb screw 21 which serves to force the tail 19 against the pointed end of the thumb screw 20 to the required extent.

The inner ring 12 is shown in Fig. 4 provided with a peripheral tongue adapted to engage an inner recess in the outer ring 9 as shown. The adjacent ends of the inner ring 12 are indicated by the reference characters 34 and 35 in Fig. 5 where it will be observed they are held in permanent relation by the jaws of the clamp 13 which may be drawn together by the screw 32. From this it will be seen that the telescope can be readily adjusted any desired degree in any given position and therefore provides a greater range of observation than is provided by the usual type of surveying instrument.

Of course it will be understood that various modifications may be made without departing from the spirit of the invention as claimed.

I claim:

1. An observation instrument, comprising a pivotally mounted base, bearings carried thereby, a ring having trunnions pivoted in said bearings, a second ring slidable with respect to said first ring and having bearings, and a sighting device having trunnions pivoted in said bearings of said second ring, one of said rings having graduations, the other of said rings having indicators for coöperating with said graduations.

2. An observation instrument, comprising a base, bearings carried by said base, a ring having trunnions journaled in said bearings, a second ring slidably mounted within said first ring and having bearings, a sighting device having trunnions journaled in said last-mentioned bearings, said second-mentioned ring being split, and means for clamping said rings together.

In testimony whereof I hereunto affix my signature in the presence of two witnesses.

ANDREW P. HARTMANN.

Witnesses:
LOUISE ENDERLE,
THOMAS O. HEIL.